United States Patent [19]

Moisan

[11] 4,181,257
[45] Jan. 1, 1980

[54] SELF-PROPELLING WATERING APPARATUS

[75] Inventor: Jean-Claude Moisan, Montpezat d'Agenais par Prayssas, France

[73] Assignee: Di Palma Irrigation S.A., Cavalle, France

[21] Appl. No.: 937,861

[22] Filed: Aug. 29, 1978

Related U.S. Application Data

[63] Continuation-in-part of Ser. No. 820,042, Jul. 28, 1977, abandoned.

[30] Foreign Application Priority Data

Jul. 28, 1976 [FR] France .................. 76 02302
Jul. 22, 1977 [FR] France .................. 77 22509

[51] Int. Cl.² .............................................. B05B 3/18
[52] U.S. Cl. ............................ 239/183; 239/191; 239/195
[58] Field of Search ................... 239/178, 183–185, 239/191, 192, 195, 197–199

[56] References Cited

U.S. PATENT DOCUMENTS

| | | | |
|---|---|---|---|
| 726,580 | 4/1903 | Shannon | 239/191 X |
| 3,415,451 | 12/1968 | Karmann | 239/191 |
| 3,478,964 | 11/1969 | Karmann | 239/191 |
| 3,687,327 | 8/1972 | Badcock | 239/183 |
| 3,770,202 | 11/1973 | Ivemy et al. | 239/184 |
| 3,942,722 | 3/1976 | Ede | 239/189 |

FOREIGN PATENT DOCUMENTS

| | | | |
|---|---|---|---|
| 293781 | 7/1967 | Australia | 239/191 |
| 698743 | 11/1964 | Canada | 239/191 |

Primary Examiner—Robert W. Saifer
Attorney, Agent, or Firm—Donald D. Jeffery

[57] ABSTRACT

A mobile watering apparatus has a framework which is provided with wheels and supports a watering nozzle as well as a drum forming rotary magazine for a pipe, one end of which is connected to the nozzle. The other end of the pipe, leaving the drum, is adapted for connection to a water supply station on the land. A hydraulic motor, actuated by water under pressure, allows the traveling of the apparatus and the joint winding of the pipe on the drum, with however, a slip clutch in the second case. This slip clutch is preferably controlled by a means responsive to the tension being exerted on the pipe.

41 Claims, 15 Drawing Figures

SELF-PROPELLING WATERING APPARATUS

CROSS-REFERENCE TO RELATED APPLICATIONS

This application is a continuation in part of U.S. patent application Ser. No. 820,042, filed on July 28, 1977.

BACKGROUND OF THE INVENTION

Watering apparatus are already known which comprise a drum or reel about which a flexible pipe is wound up which serves to feed with water a nozzle projecting water.

However, in all said devices, and when watering is performed, the pipe is either pulled when unwinding or winding up about the drum, or dragged on the ground when unwound. This is a grave drawback because it is to be considered that said pipes have a great section (about 1 $dm^2$) and are very long (for example 300 meters), so that the total weight of the pipe which is pulled during watering is very high which results in a quick deterioration of said pipe.

Furthermore, during the traction exerted on the pipe the latter frequently meets an obstacle which adds a further resistance to the traction, said resistance increasing the weight of the pipe fed with water.

Also, many of said known apparatus do not make it possible to guide the apparatus by itself on the surface to be watered during winding up or unwinding of the pipe, which requires the presence of an operator to check the right direction of said apparatus or additional means such as a hauling and guide-cable for the apparatus.

In addition, said apparatus are not totally self-propelling and then do not ensure the travelling of same before and after watering is performed without using a tractor, nor the unwinding and winding up of the pipe before and after watering is performed.

SUMMARY OF THE INVENTION

An object of the present invention is to remedy the drawbacks of the apparatus known in the prior art, while making possible to wind up the pipe about the drum under a slight tension necessary to ensure a suitable winding up, but sufficiently weak for preventing the pipe from being deteriorated.

Another object of this invention is to provide for a watering apparatus having a hydraulic motor actuated by the irrigating water, and capable of driving both supporting wheels of the apparatus and, through a slip coupling, the drum for winding up the pipe.

Another object of this invention is to provide for a watering apparatus having guiding wheels and guiding means cooperating with the pipe lying with the ground for controlling said guiding wheels, at least during a portion of the watering operation.

A further object of this invention is to provide for an apparatus of the above mentioned kind having an auxiliary motor, such as an internal combustion engine, for driving by an operator outside the watering operation, said driving including travelling the apparatus and/or winding up the pipe on the drum.

Another object of this invention is to provide for a watering apparatus having a timing means capable of extending the watering for a predetermined time-period after stopping of the apparatus at the end of its travelling.

Still another object of this invention is to provide for a watering apparatus of the above mentioned kind, capable of a first watering stage while winding up the drum, and of a second watering stage while unwinding the drum. In the second watering stage, the slide coupling is switched into an uncoupled position; then, the apparatus is advantageously guided by means cooperating with a furrow made in the ground, or the like.

This invention also provides for an apparatus capable of operation with a supple pipe.

In accordance with a further object of this invention, the apparatus comprises a tension detector means, cooperating with the pipe at the outlet of the drum, said tension detector means being responsive to the fact that the tension of the pipe exceeds a predetermined value by controlling said slip coupling to decelerate the drive of the drum.

In accordance with another object of this invention, the apparatus further comprises a special winding device comprising a carriage cooperating with the pipe, and means for driving the carriage in a movement of alternate translation synchronized with the rotation of the drum, thus permitting to wind up the pipe in regular layers.

DESCRIPTION OF THE DRAWINGS

Other objects and advantages of this invention will appear in the following detailed description, made with reference to the drawings, to depict the invention by way of non-limitative example.

In the drawings.

DETAILED DESCRIPTION OF THE INVENTION

As previously noted the present invention is aimed to provide a watering apparatus showing a great security in view of the fact that no undue pull occurs on the pipe when watering is performed.

The embodiments of the apparatus which will now be described with reference to FIGS. 1 to 10 make possible the watering of large surfaces with the watering operation being performed in two stages following one another without stopping and in the same travelling direction of the carriage; the first watering stage is performed while the drum winds up the water feeding pipe, while the second watering stage which is immediately performed and in the same travelling direction of the carriage is performed while the pipe unwinds its supporting drum.

Figure 1:
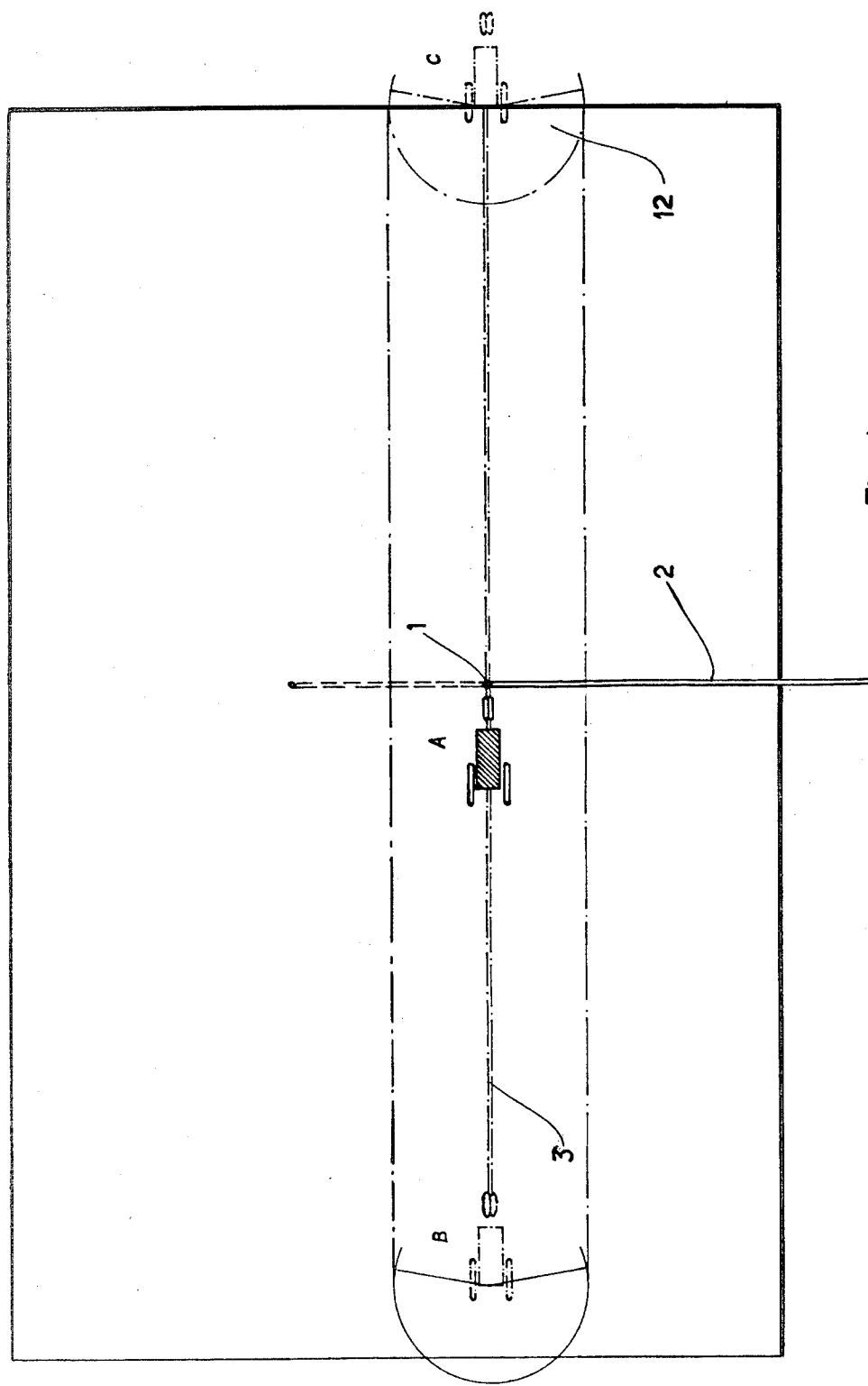
FIG. 1 is a view from above of the apparatus according to the invention diagrammatically showing the travelling thereof on the surface to be watered.
Figure 2:
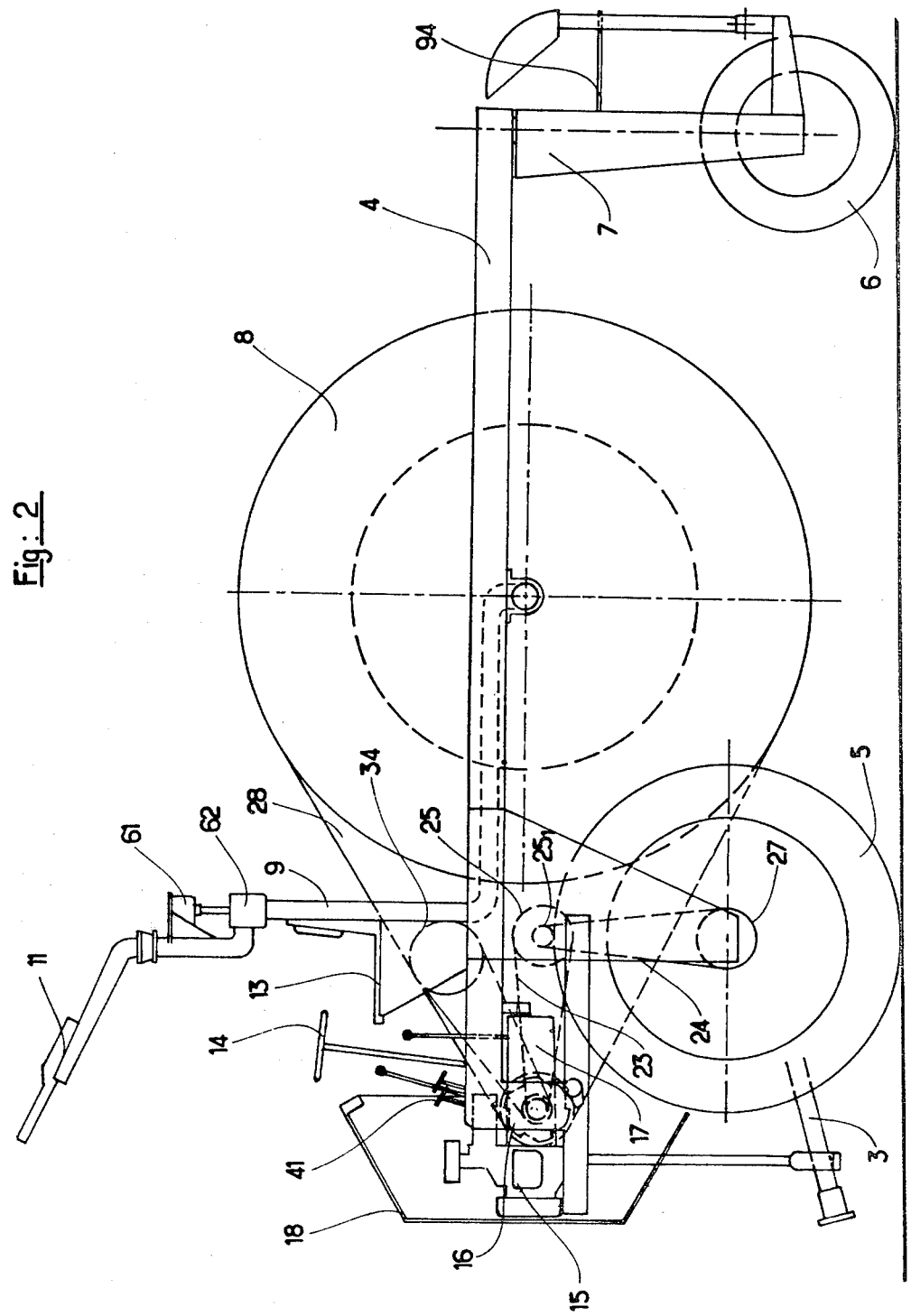
FIG. 2 is a side view of a first embodiment of the apparatus of the invention.

FIG. 1 diagrammatically shows how said embodiments of the apparatus work.

Initially, the external end of the flexible watering pipe, wound up about its supporting drum, is connected at 1 to a fixed water feeding pipe, or water supply station, which is preferably positioned across the middle of the area to be watered.

The watering apparatus, which is initially positioned at "A" is then driven by an operator up to the end of the area to be watered (position B) while the pipe 3 freely unwinds from the drum. Energy for this operation is obtained from an internal combustion engine.

At that stage, then the watering period begins during which the apparatus is automatically driven from "B" to "A" while the supporting drum of the pipe is driven into rotation so as to re-wind up the watering pipe.

When the apparatus reaches "A", the pipe is totally wound up and said apparatus still travels automatically in the same direction without stopping so as to reach "C" at the other end of the surface to be watered, while watering is performed without any interruption and that the pipe freely unwinds from its supporting drum.

However, it is to be noted that, depending on the length of the area to be watered, the watering operation may end at "A" or the second watering period can be performed by unwinding the flexible pipe up to "C".

The travelling of the apparatus from "B" to "C" by passing by "A" when watering is performed is ensured by a hydraulic motor fed by the watering water.

When "C" has been reached, the engine is started again so as to re-wind up the pipe, what is achieved without too much efforts, said pipe being no longer under pressure.

Then, the apparatus can be removed by being driven by the engine so as to be brought to another place to be watered.

The apparatus shown in the attached FIGS. 1–10 consists of a framework 4 carrying two supporting and driving wheels 5 and a steering-wheel 6 fitted rotative to a pivoting support 7.

Said framework supports a drum or reel 8 about which the water feeding pipe 3 winds up, the axis of said drum being connected by a tube 9 to a nozzle 11, which ensures the projection of the water along arcs of circle 12 (see FIG. 1) when the apparatus is travelling.

Also, said framework carries a piloting station with a seat 13, a wheel 14 connected to the support 7 of the steering-wheel 6 and an internal combustion engine 15 associated with a differential 16, a gear-box 17, and a fuel tank (not shown), the whole being protected by a hood 18.

Said engine 15 is designed to drive driving-wheels 5 for moving the apparatus when watering is not performed and, for example, for bringing it to the place to be watered, as well as for the re-winding up of the pipe 3 about its drum 8 when the watering operation is over.

To this end, semi-shafts 19 and 20, connected to the differential 16, carry pinions 21 and 22 which are connected (see FIGS. 2 and 3) through chains 23 and 24 and intermediate pinions 25 and $25_1$ to pinions integral with driving-wheels 5.

For the re-winding up of the pipe 3 when watering is over, the drum 8 is driven into rotation from a pinion 28 which is connected to a cogged-ring $8_1$ provided at the peripheral of the drum 8 by a chain $28_1$. The selection of the driving of the wheels 5 for the travelling of the apparatus, or of the driving of the drum 8 for the unwinding of the pipe 3, is operated by working a lever $29_1$ which operates a direct-drive dog-clutch device 29 located between the pinions 21 and 28. Thus, by moving said lever $29_1$ in one direction, the direct-drive dog-clutch device 29 fitted to a grooved portion of the semi-shaft 19 drives the pinion 21 and then the driving-wheels 5, while by making said lever $29_1$ pivote in the other direction, said lever engages the additional direct-drive dog-clutch device integral with the pinion 28 so as to drive the drum 8.

Besides, at the free end of the semi-shaft 19, a friction clutch device 30 is arranged, which is connected by a chain 31 to an intermediate pinion 32 itself driving through a shaft 33 a pinion 34 engaging the chain 28 extending between the pinion 28 and the ring $8_1$.

As it will be explained hereafter, said transmission is designed to drive the drum 8 and make the pipe 3 wind up about said drum when the first stage of watering is performed.

Also, two ratchet-wheels 35 and 36, two flexible couplings 37 and 38 and two cheeks 39 and 40 are arranged on the semi-shafts 19 and 20, while two pedals 41 are provided in the piloting station so as to allow the independent braking of either of said cheeks 39, 40 depending on whether it is sought to immobilize either of said semi-shafts 19 and 20, such as this will be explained hereafter.

Each of said ratchet-wheel 35 and 36 can co-operate with a catch or pawl 41 (see FIG. 5) which is fitted pivoting at 42 to the end of an arm 43 mounted rotating about semi-shafts 19 and 20. Both said catches 41 are connected to the end of the rod 44 of a jack 45 which constitutes a hydraulic motor called first motor of the apparatus. Said jack 45 is fed with water from the tube 9 (connecting the axis of the drum 8 to the watering nozzle 11) through ducts 46 carrying a filtering device 47, a two-channel tap 48 and a slide-valve 49. Slide-valve 49 determines, in known fashion, an alternative motion of the rod 44 of the jack 45: slide-valve 49 has two outlets connected to respective inlets of jack 45; the rod 44 of jack 49 is connected to an auxiliary rod 52 having two abutments 51, spaced from each other; a rocking pallet 50, operated alternately by abutments 51, operates in this turn the piloting rod $49_1$ of the slide-valve 49.

Said jack 45 is mounted pivoting at 53 on the framework 4 of the apparatus; when water under pressure is brought into the slide-valve 49 and the jack 45 through the ducts 46, the rod 44 is driven alternately so that the two catches 41, by engaging the teeth of the ratchet-wheels 35 and 36, drive into rotation the semi-shafts 19 and 20 so as to make the apparatus move forwards in the direction of arrow F (FIG. 3) while said water under pressure feeds the nozzle 11 to perform watering.

Also, the slide-valve 49 carries, in known fashion, two tail-pipes 54 which ensure the drainage of the water from the chamber of jack 45 which is not being put under pressure.

The two-channel valve 48 which feeds through one of its channels (duct 55) the valve 49, feeds through its other channel a duct 56 carrying a tap 57 for adjusting the delivery of water feeding, through a duct 58, a tank 59 having a draining aperture 60. In addition, said duct 58 feeds a device 61 responsive to the water pressure within the duct 58 (and then within tank 59) so as to operate, when said pressure is sufficient, the working of a device 62 in order to interrupt the feeding of the nozzle 11 with water, as will now be described.

Said two-channel valve 48 is connected, so as to be operated, to a cable or a rod 63 which is besides fitted to (see FIG. 8) a lever 64 pivoting at 65. The lower end 66 of lever 64 is positioned lateral to the steering-wheel 6 in such a way that it can be actuated by a fixed abutment put into the ground at the end of the area to be watered.

Thus, when said lever 64 is rocked by said abutment (not shown), the valve 48 is rocked so as to cut off the feeding of the slide-valve 49 (and then of the jack 45) and, on the contrary, to feed the duct 56.

When said jack 45 is no longer fed the apparatus immediately stops while the feeding of the duct 56 generates the filling up of the tank 59 at a speed which depends on the adjustment of the tap 57. When said tank 59 is filled up, the pressure inside the duct 58 reaches its maximum and the device 61 responsive to the pressure of the water then operates the closing of the device 62 to stop the watering.

It can then be seen that as soon as the apparatus is stopped watering is still proceeding during a certain time corresponding to the time required for filling up the tank 59 so taht the nozzle 52 may suitably water the end of the area at the end of its travelling.

Figure 5:
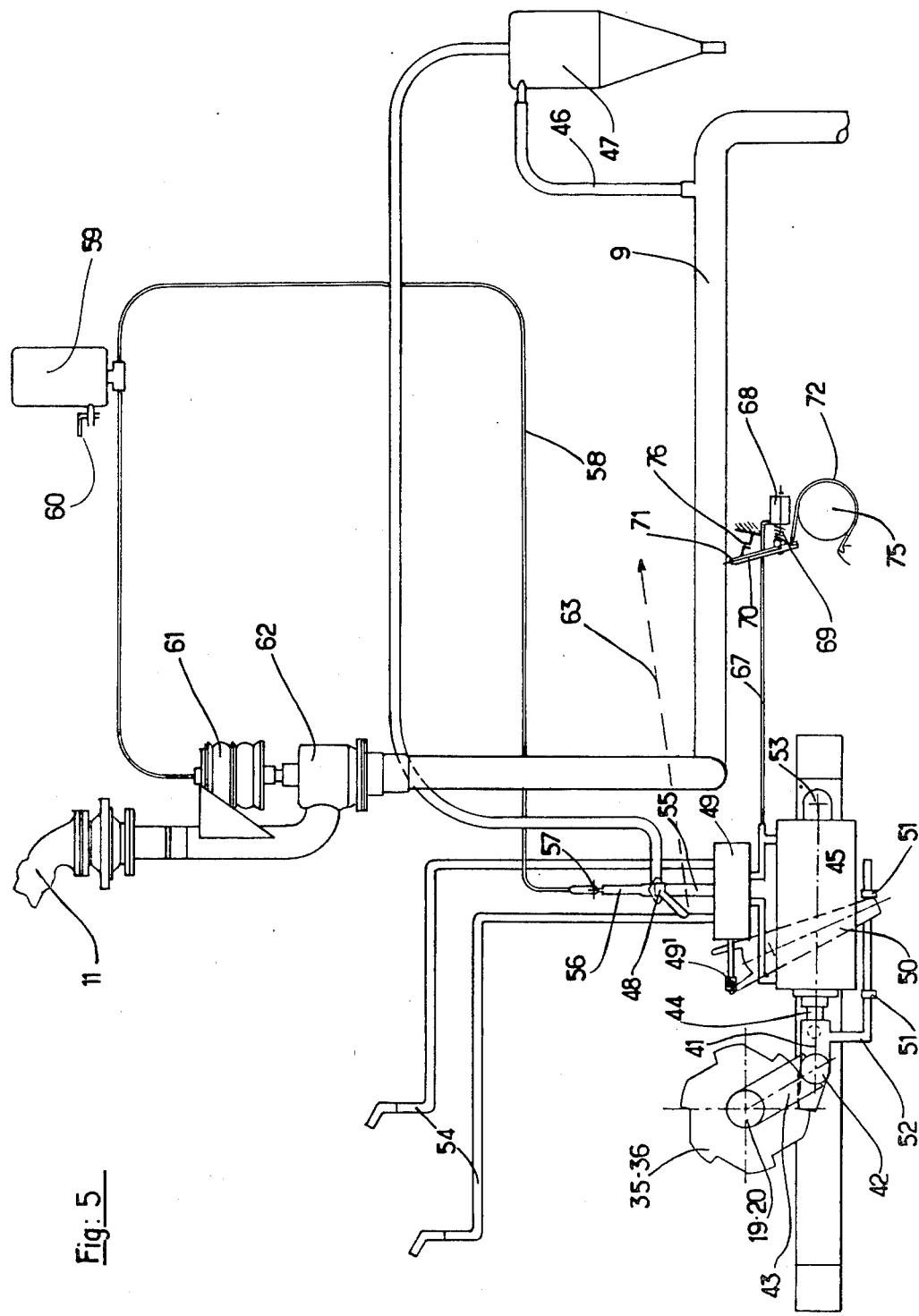
FIG. 5 shows the hydraulic circuit of the apparatus.
Figure 6:
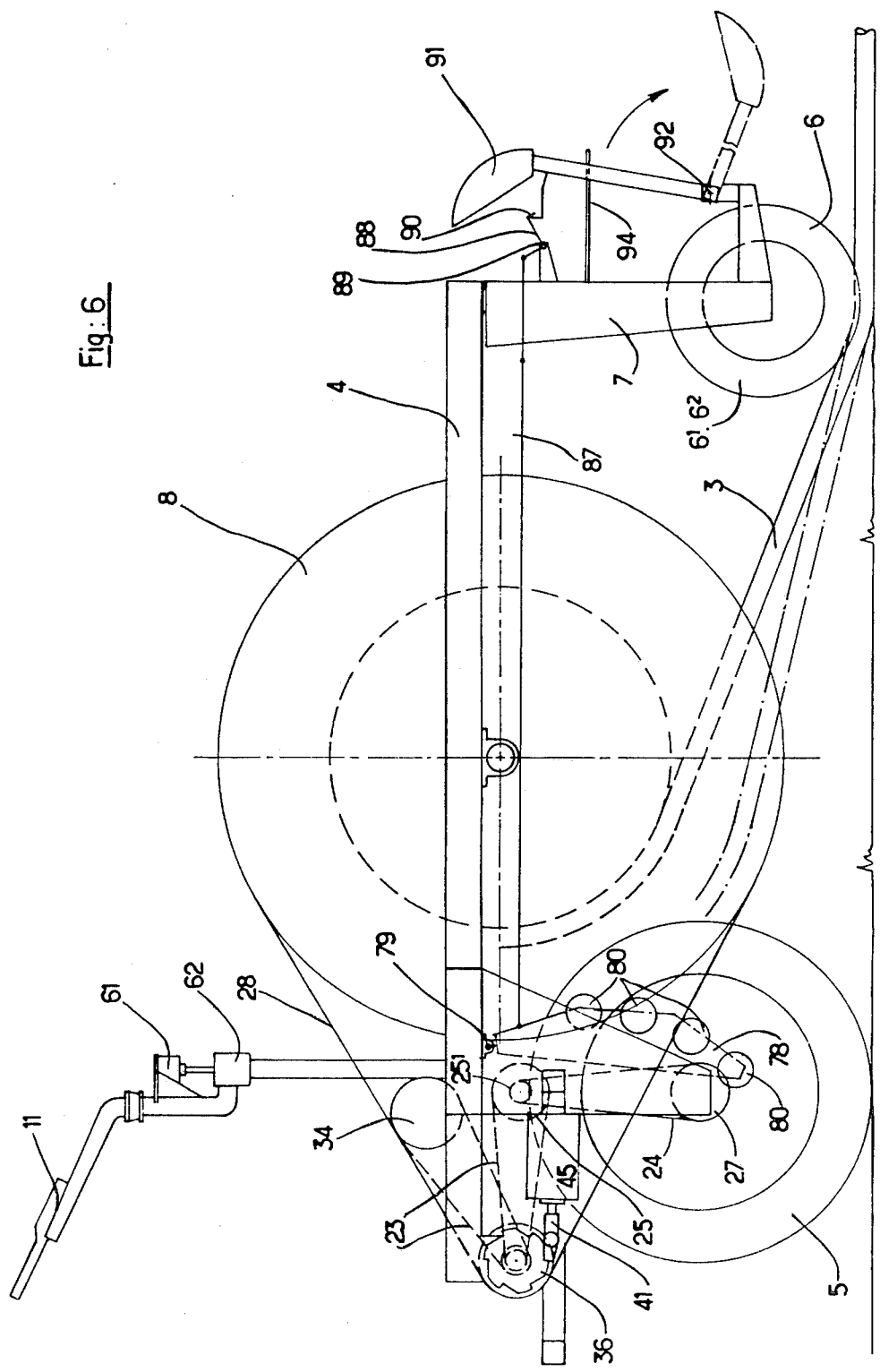
FIG. 6 is a diagrammatical side view showing the apparatus during watering at its first travelling stage while the pipe winds up about the drum.

Also, as it can be seen in FIG. 5, one of the ducts connecting the slide-valve 49 to the jack 45 is connected to a duct 67 feeding a small jack 68 whose rod, which carries a spring 69, is hinged about a lever 70 pivoting at 71. Said jack 68 is fed when the rod 44 of the jack 45 leaves its cylinder, that is to say when the wheels 5 are driven, so as to compress said spring 69 and release the braking strap 72 distributed about the axes 75 of the wheels 5.

Said devices then make it possible to ensure the immobilization of the apparatus so as to prevent it, for example, for moving backwards when it is not being driven by the jack 45.

Also, a ratchet device 76 is provided on the lever 70 which can make the braking strap 72 ineffective, for example when the apparatus is carried on roads.

When the apparatus is travelling from B to A under the action of the jack 45 so as to perform the first watering stage, the drum 8 is driven into motion by the clutching device 30 and the chains and pinions 31, 32, 34, 28. Such a mechanical transmission has a ratio such as, in view of the travelling speed of the carriage, during the travelling period there is a slide in said clutching device 30 which makes it possible to wind up the pipe 3 about the drum 8 under a slight tension necessary to ensure a suitable winding up, but sufficiently weak for preventing the pipe from being deteriorated.

While said pipe winds up, the steering-wheel 6 which consists of two wheels $6_1$ and $6_2$ V-shaped positioned so as to make together a concave lower area $6_3$ overlaps the pipe 3 which constitutes the guide-means of the apparatus.

Figure 7:
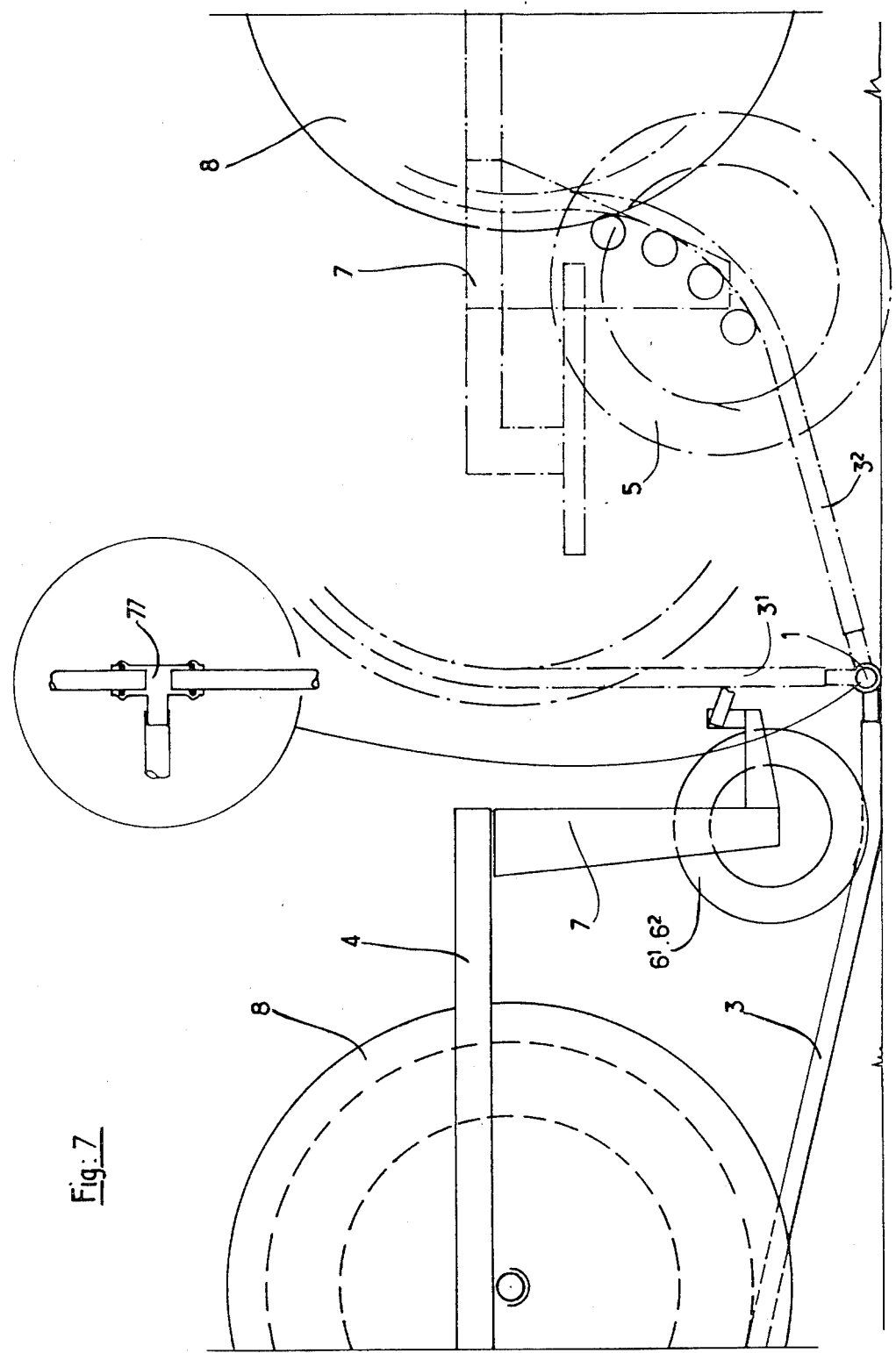
FIG. 7 shows the passage from the first watering stage with winding up of the pipe to the second watering stage with unwinding of the pipe.

When the apparatus arrives at "A" and passes over the fixed pipe 2, the direction of the pipe 3 is modified so as to be such as shown at $3_1$ then at $3_2$ in FIG. 7.

Said modification of the direction of the pipe 3 is made possible in view of the fact that said pipe is connected at 1 to the fixed tube 2 by a rotating casing 77 which carries a tightness joint and whose axis is arranged parallel to the axis of the drum 8.

Thus, when the apparatus travels from one side to another of the connecting point 1, the direction of the pipe 3 with respect to the apparatus is reversed.

On the framework 4 (particularly see FIGS. 6 and 8), an apron 78 pivoting at 79 is provided which carries rollers 80.

Said apron is positioned in such a way at the vicinity of the drum 8 that it is rocked by the pipe 3 when said drum passes over the connecting point 1 and that the direction of said pipe tends to become that shown at $3_2$ in FIG. 7.

Figure 4:
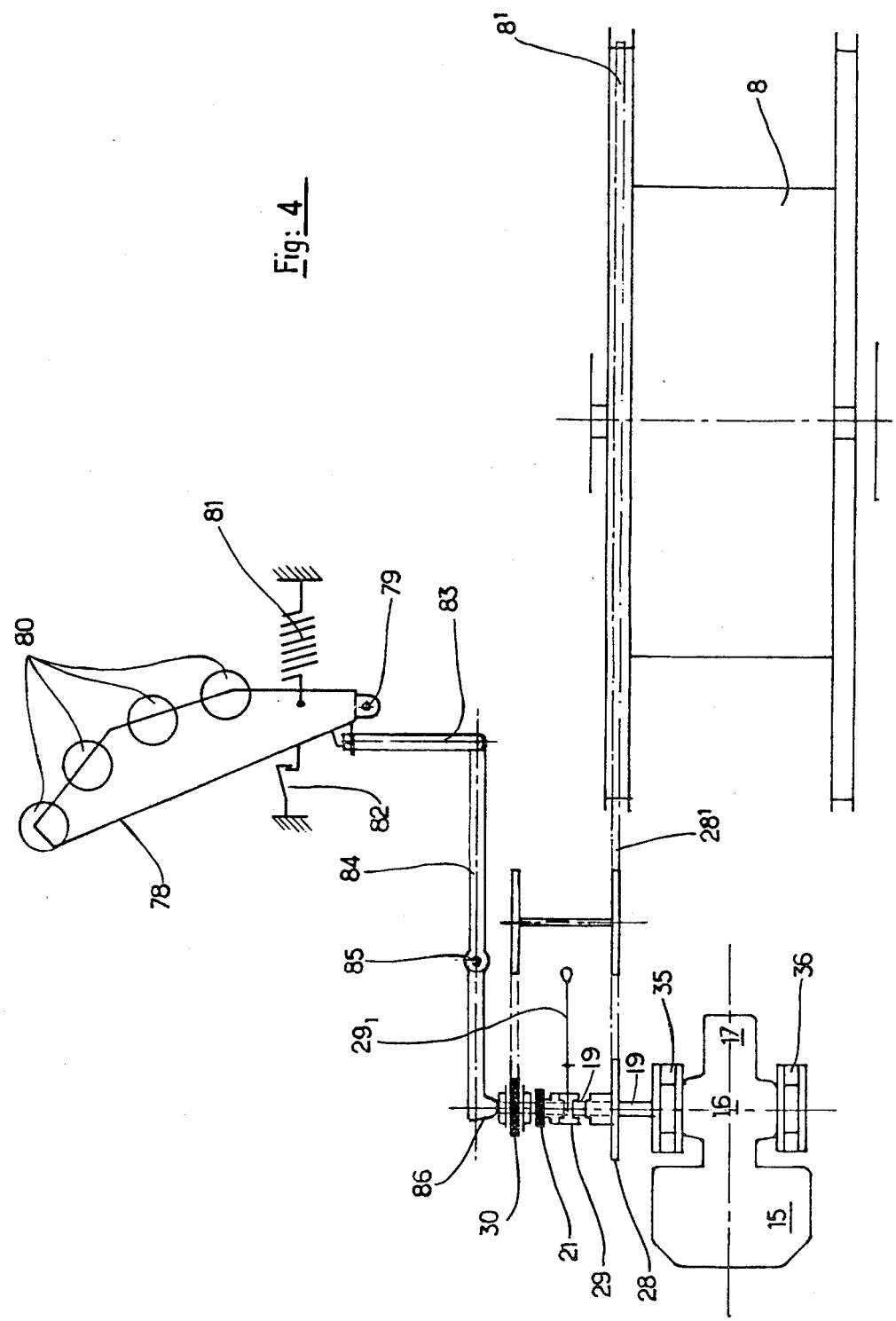
FIG. 4 is a part view showing the operating means of the watering device for driving the drum.

As shown in FIG. 4, said apron 78 is hitched to a spring 81 which tends to always bring it back to its former position. Besides, a ratchet device 82 is provided on said apron 78 which, if sought, keeps it in a rocked position.

The apron 78 is connected by a rod 83 to a lever 84 pivoting at 85, the free end of which 86 rests onto the clutching device 30.

It can be then understood that when the apron 78 is rocked by the pipe 3, said pipe 3 thereby operates the clutching device 30 so as to interrupt the mechanical deriving of the drum 8 from the jack 45. Then, after having passed over the connecting point "A" the apparatus is still driven by the jack 45 when watering is performed, but said drum 8, which is no longer driven, can now freely unwind according to the forwards motion of the carriage.

Also, when the apron 78 is being rocked, a rod 87 to which it is connected (see FIG. 6) makes the bent lever 88 pivoting at 89 rock so that the hook 90 releases the blade 91 mounted pivoting at 92 at the front of the support 7 of the wheel 6. The blade 91 which is convex-shaped then rocks and comes into a furrow 93 (FIG. 8) previously made into the ground beyond the connecting point 1 in the forwarding motion direction of the apparatus. Said blade 91 constitutes the guide-means of the wheels 6 and then of the apparatus too when the second watering stage is performed.

It can be seen (see FIG. 6) that said blade 91 can be kept in a fitted position by a hook 94 fitted to the support of the steering-wheel 6, when desirable.

Also, (see FIG. 8), the apron 78 carries a hook 95 which can be connected to a chain 96 so as to keep said apron in a rocked position if necessary.

The watering apparatus provided by the invention works as follows:

The apparatus being brought at "A" (FIG. 1), the chain 96 is hitched to the hook 95 (FIG. 8) so as to keep the apron 78 in a rocked position and to disengage the clutch device 30 (FIG. 3) through the rods 83, 84 (FIG. 4), thereby permitting the pipe to unwind.

Figure 3:
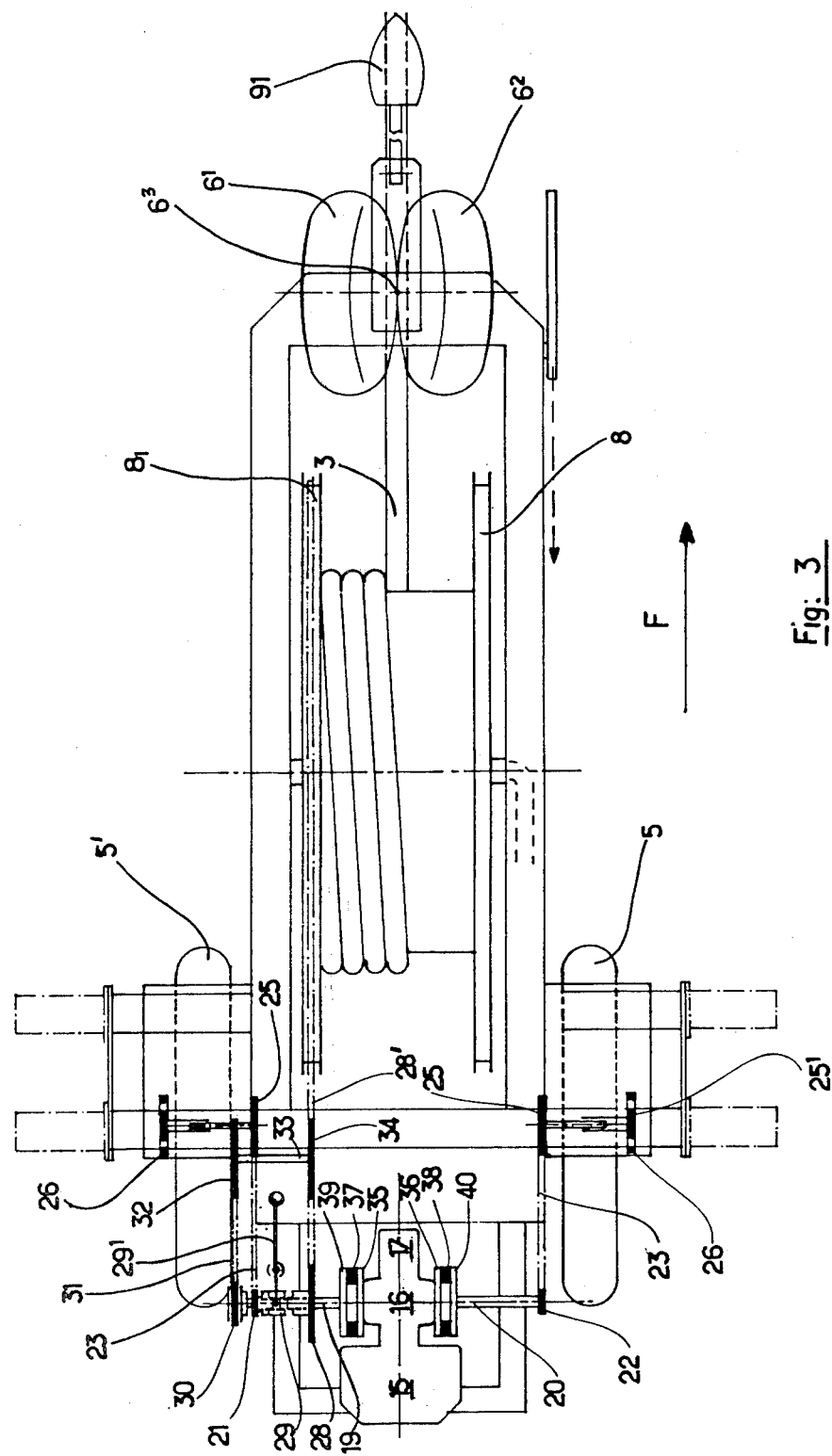
FIG. 3 is a part view from above of apparatus of FIG. 2.

Then, the operator hitches the pipe 3 on to the pivoting casing 77 of the fixed tube 1, then takes place at the piloting station to drive the apparatus from "A" to "B". To this end, the driving-wheels 5 are driven from the engine 15 through the direct-drive dog-clutch device 29 cooperating with the pinion 21 (FIG. 3).

When arrived at "B", the operator puts the steering-wheel 6 on the pipe 3 and stops the engine 15.

The chain 96 is then parted from the hook 95 so as to release the apron 78 while the pivoting catches 41 are rocked so that they may engage the teeth of the ratchet-wheels 35 and 36.

Then the operator leaves the apparatus and puts the fixed pipe or water supply station 2 under pressure which as a results feeds the jack 45 and then, on the one hand drives the apparatus in the direction of arrow F (FIG. 3) through the direct-drive dog-clutch device 29 still connected to the pinion 21 and, on the other hand, drives the drum 8 into rotation through the clutching device 30 previously engaged further to the release of the apron 78, thereby winding up the pipe.

During said travelling, the jack 68 is fed (FIG. 5) so as to generate the braking of the apparatus during all the time said apparatus is not driven by the jack 45.

During watering, the apparatus continues to move from "B" to "A" and is guided by the wheel 6 overlapping the tube 3.

When the apparatus reaches "A", it makes the pivoting casing 77 rock (see FIG. 7). The pipe 3 in its position $3_2$ makes the apron 78 rock so as to disengage the clutching device 30. Then, the drum 8 is no longer driven while the apparatus continuous to travel in the same direction by being driven by the jack 45. Then the drum 8 starts to unwind while watering is performed.

Figure 8:
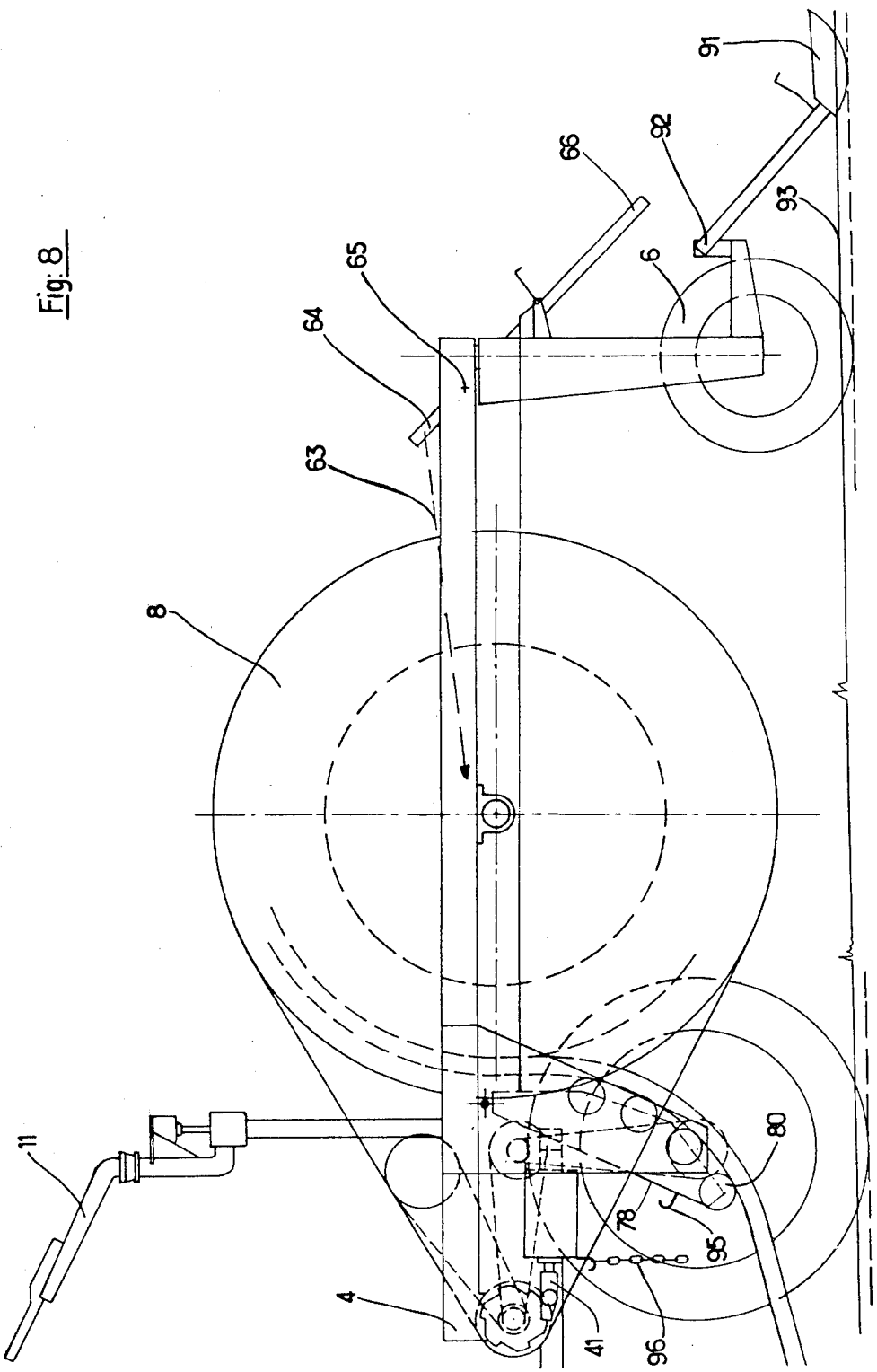
FIG. 8 shows the apparatus during its watering travelling while the pipe unwinds.

At the beginning of this second watering stage, the apron 78 has also operated the hook 90, which results in the release of the blade 91 so that said blade may constitute the guide-means of the apparatus by travelling in the furrow 93 (FIG. 8).

When the apparatus reaches "C", the lever 64 is rocked by the abutment fixed into the ground which operates the two-channel valve 48 (see FIG. 5) so as to determine the stoppage of the feeding of the jack 45 and then that of the apparatus and, on the contrary, operate the filling up of the tank 59 so as to operate the stoppage of the watering after a period of time determined by the adjustment of the tap 57.

The apparatus being totally stopped, the over-pressure of water generated at the pumping station (not shown) feeding the pipe 1 causes, through devices known in themselves, the stoppage of the water feeding.

Then the operator may disconnect the pipe 3 from the connecting device 1, work the direct-drive dog-clutch device 29 so as to connect it to the pinion 27, the blade 91 being kept in a lifted position by the hook 94, hitch the chain 96 to the apron 78 to keep it in a rocked position, and make the catches 41 rock for putting them aside from the ratchet-wheels 35, 36.

The engine 15 is then set to work while one of the pedals 41 is actuated so as to immobilize the semi-shaft 20. Thus, and thanks to the differential device, only the semi-shaft 19 is driven into rotation in such a direction that it causes, through the pinion 28, the re-winding up of the pipe 3 about the drum 8.

Said re-winding up of the pipe being over, the direct-drive dog clutch 29 is set in a reverse position. The operator sat on its seat 13 can then drive the apparatus by means of the hand-wheel 14 towards a further watering area, said apparatus being of course in such a case driven by the engine 15.

Figure 9:
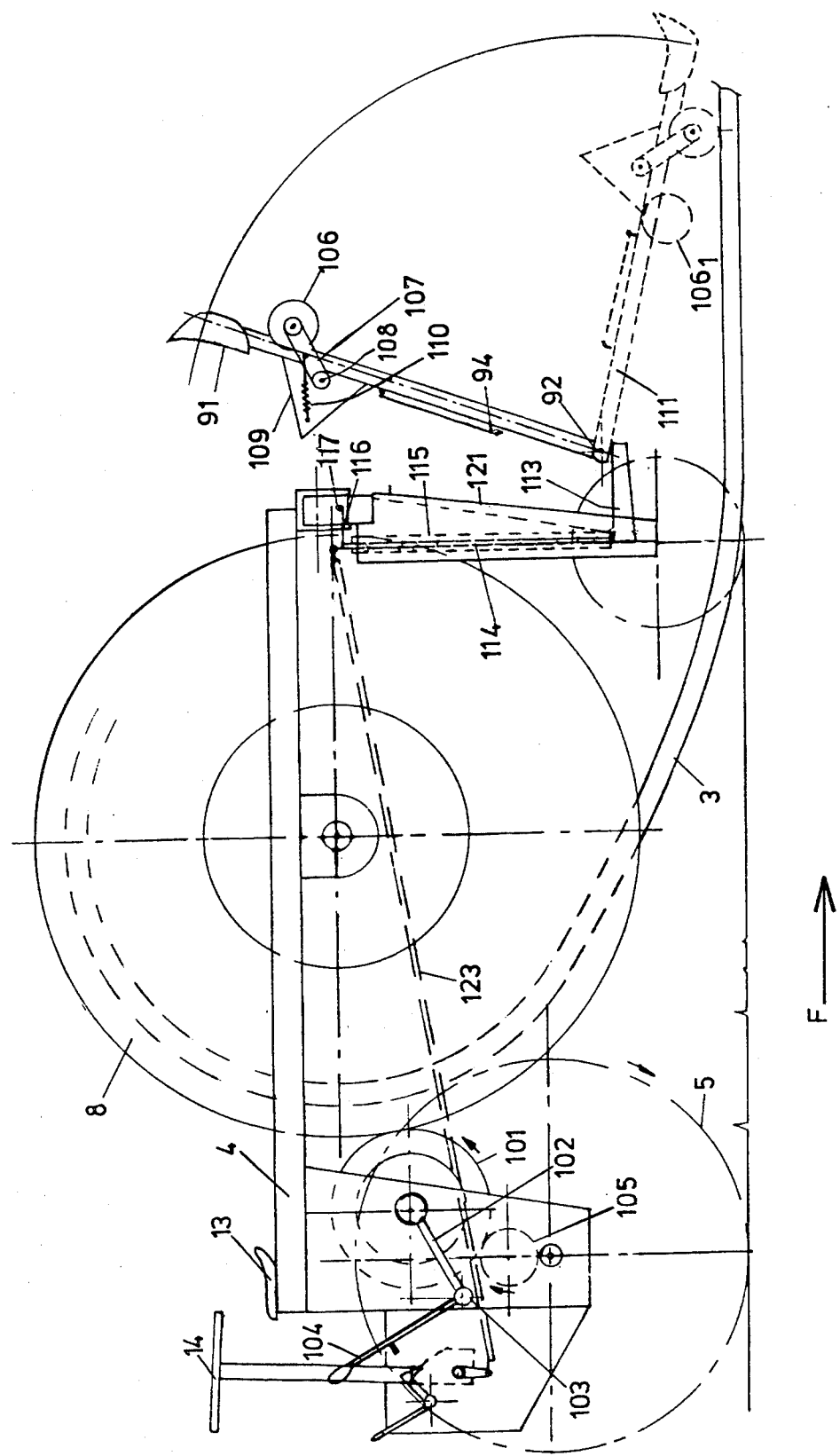
FIG. 9 is a diagrammatical side view of a second embodiment of the apparatus according to the invention.
Figure 10:
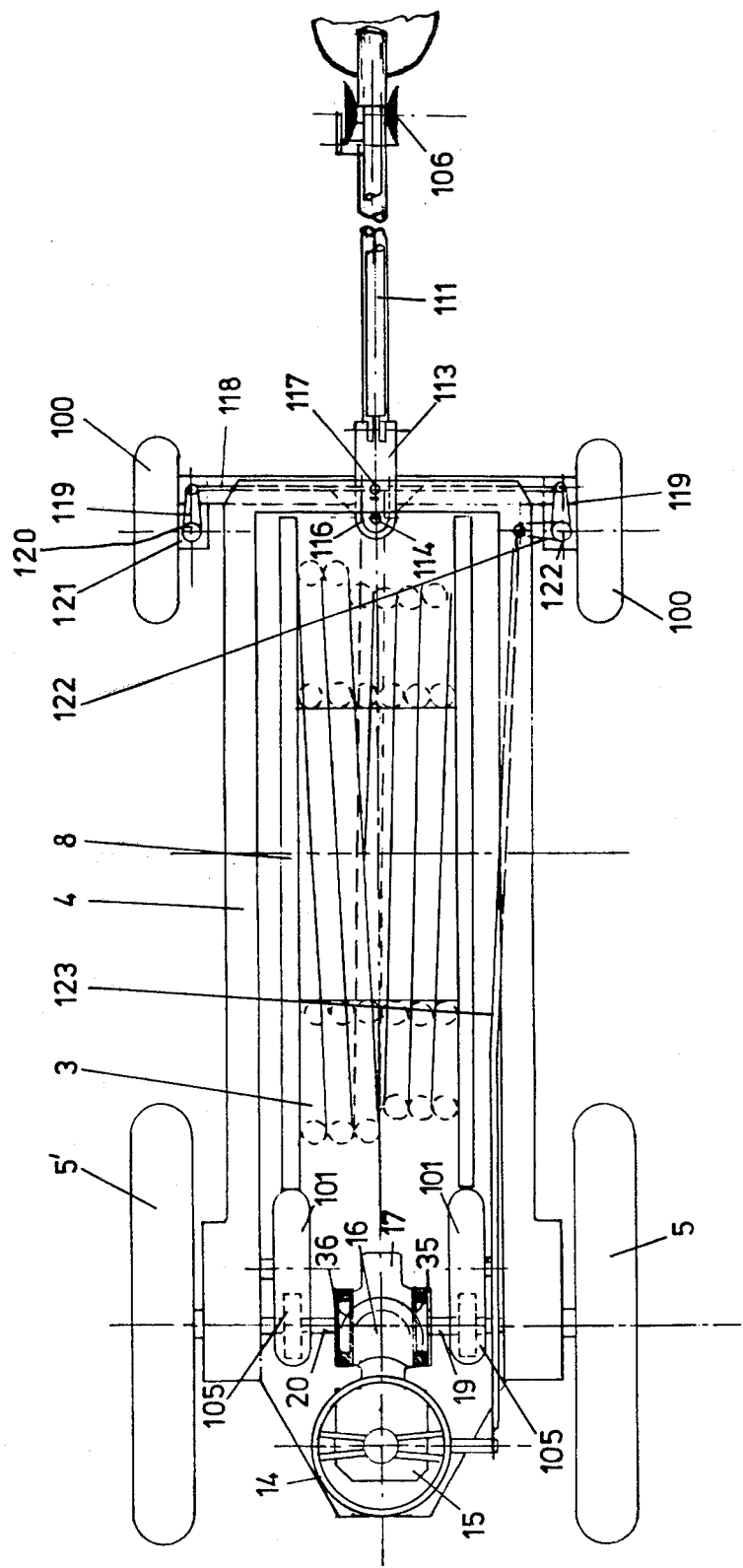
FIG. 10 is a view from above of FIG. 9.

According to the second embodiment shown in FIGS. 9 and 10, the driving of the drum 8 to generate the winding up of the pipe 3 during the first watering stage is obtained through friction wheels 101 mounted rotating at the ends of arms 102 pivoting at 103, the angular position of the arm 102 being operated by a lever 104.

Thus, when said lever 104 is positioned in one of its two possible angular positions, the wheels 101 apply by their peripheral portion, on the one hand against the periphery of the cheeks of the drum 8, on the other against rollers 105 fitted to the semi-shafts 19 and 20 outside the differential 16, and semi-shafts 19 and 20 being driven by the ratchet-wheels 35, 36 with which catches (not shown) co-operate which are fitted to the ends of the hydraulic jacks also fed with the watering water.

During this first watering stage, the guiding of the carriage and the winding up of the pipe are ensured by a small wheel 106 essentially consisting of two cheeks connected to one another by an axis, said small wheel being overlapping the pipe 3 laying on the ground.

Said small wheel 106 is fitted rotating to the end of an arm 107 pivoting at 108 onto a supporting plate 109, said arm 107 being also hitched to a spring 110 secured to the plate 109.

Said assembly constitutes a rocking mounting with two stable positions of the small wheel 106, the latter being positioned at $106_1$ when the pipe 3 is totally wound up and comes into contact with the connecting mouth of the water circuit to which the pipe 3 is connected.

At that time, watering will proceed while the pipe will unwind, and during this second watering stage the guiding of the carriage is ensured by the blade 91 which, in view of the rocking of the small wheel 106 at $106_1$ falls into a guide-furrow.

The blade 91 and the small wheel 106 are fitted to the end of a pole 111 pivoting at 92 so as to be kept in a high position by the hook 94.

The pivot 92 is integral with an extension 113 itself integral with a vertical axis 114 fitted rotating inside a column 115 positioned along the median vertical plane of the apparatus.

The upper end of the axis 114 is integral with a fork 116 between the legs of which the stud 117 is positioned, said stud being integral with a steering-bar 118 hinge-fitted to the ends of rods 119 (see FIG. 10) each of said rods being integral with vertical shafts 120 swivelled into supports 121 so as to ensure the direction of the wheels 100 by their lower ends.

Also, the upper end of one of the vertical axes 120 carries a rod 122 connected through a rod 123 to the steering-gear carrying the steering-wheel 14.

The direction of the apparatus according to the invention is then reversible in view of the fact that it can be ensured either by the wheel 14 or by the pole 111 from the blade 91, or by the small wheel 106.

Figure 11:
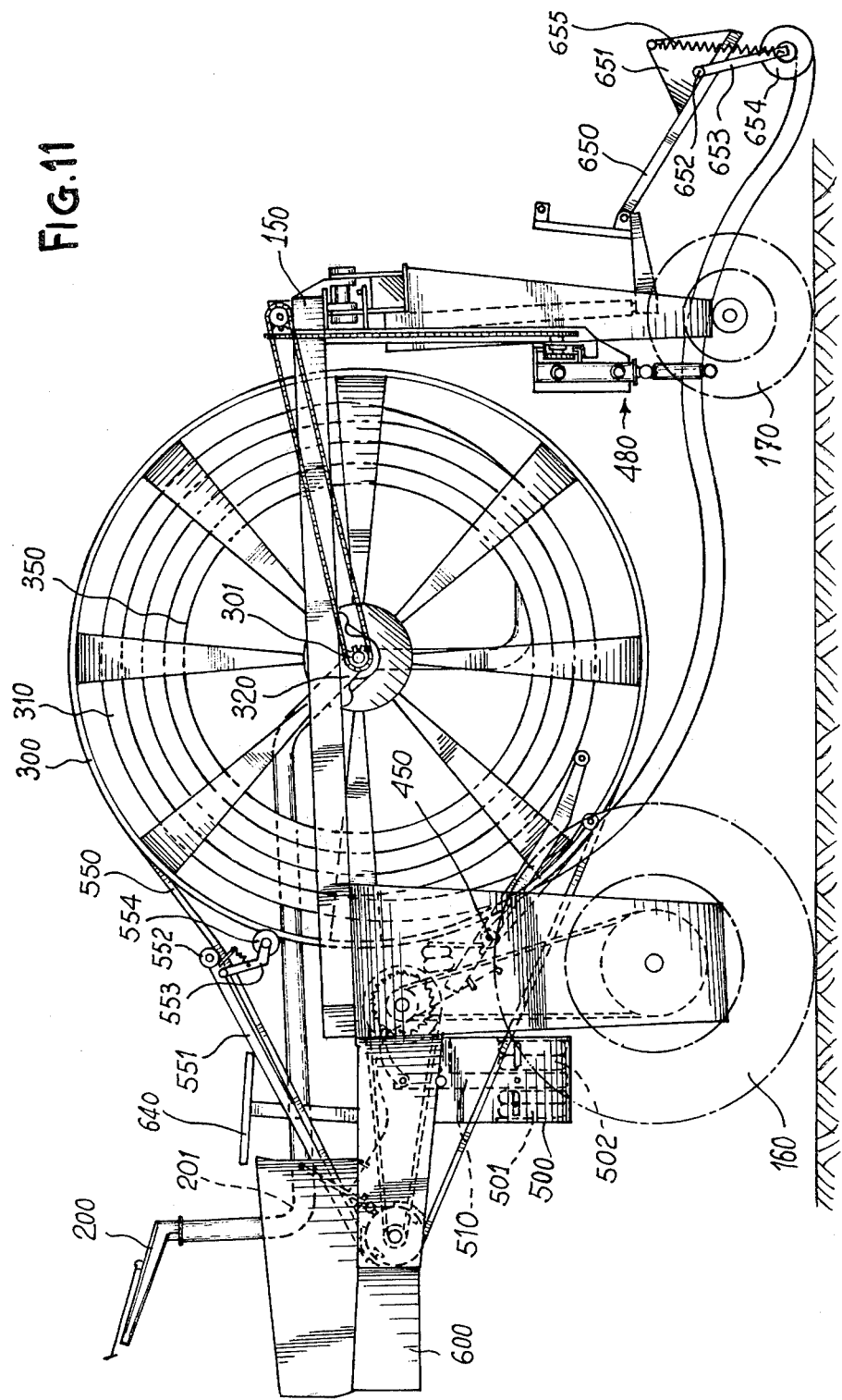
FIG. 11 is a side view of a third embodiment of the apparatus of the invention.
Figure 12:
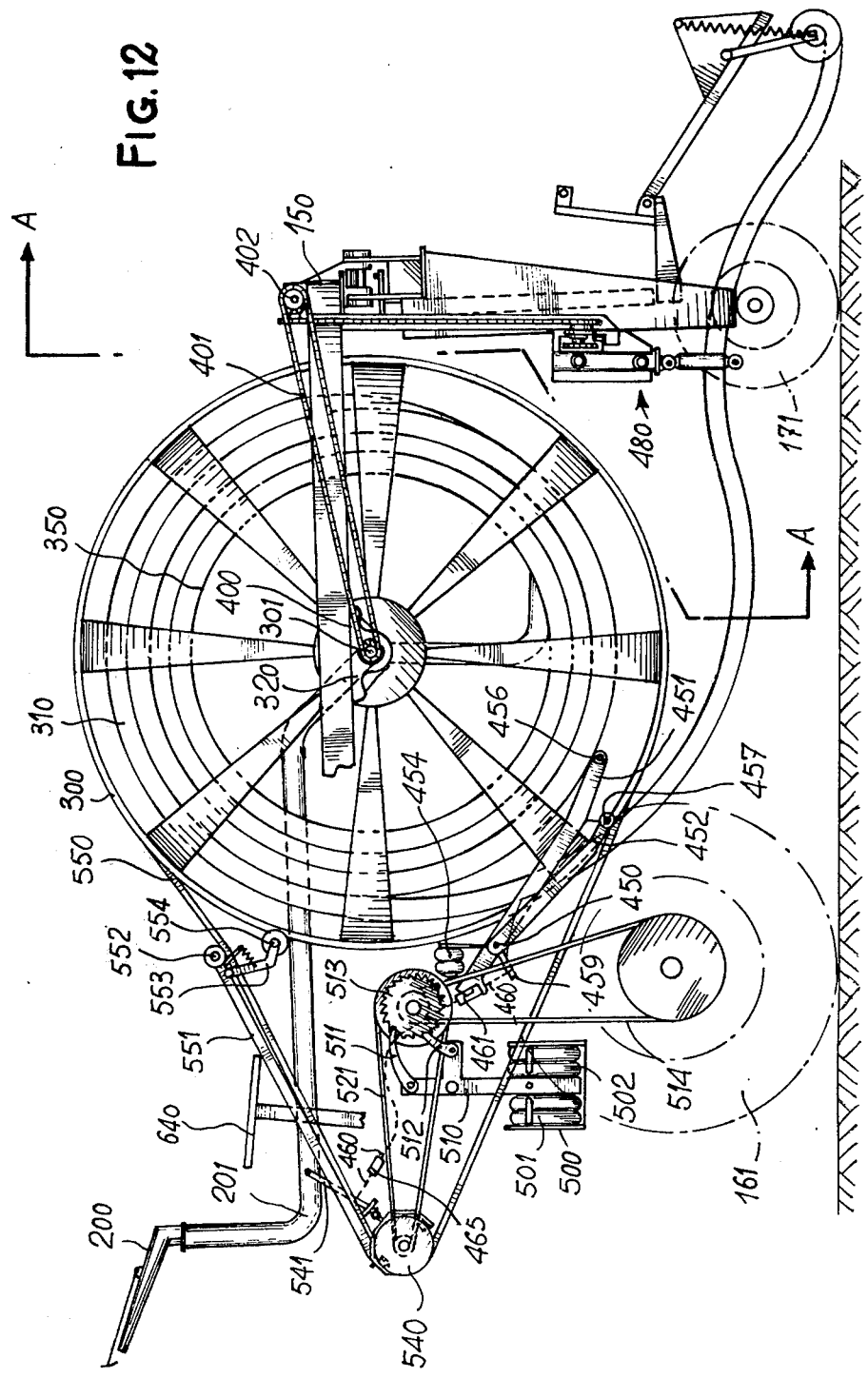
FIG. 12 is the same view as FIG. 11, but with the framework, a driving wheel and the auxiliary drive motor having been partially removed for better illustration of the hydraulic motor and of its connection with the driving wheels and the drum.
Figure 13:
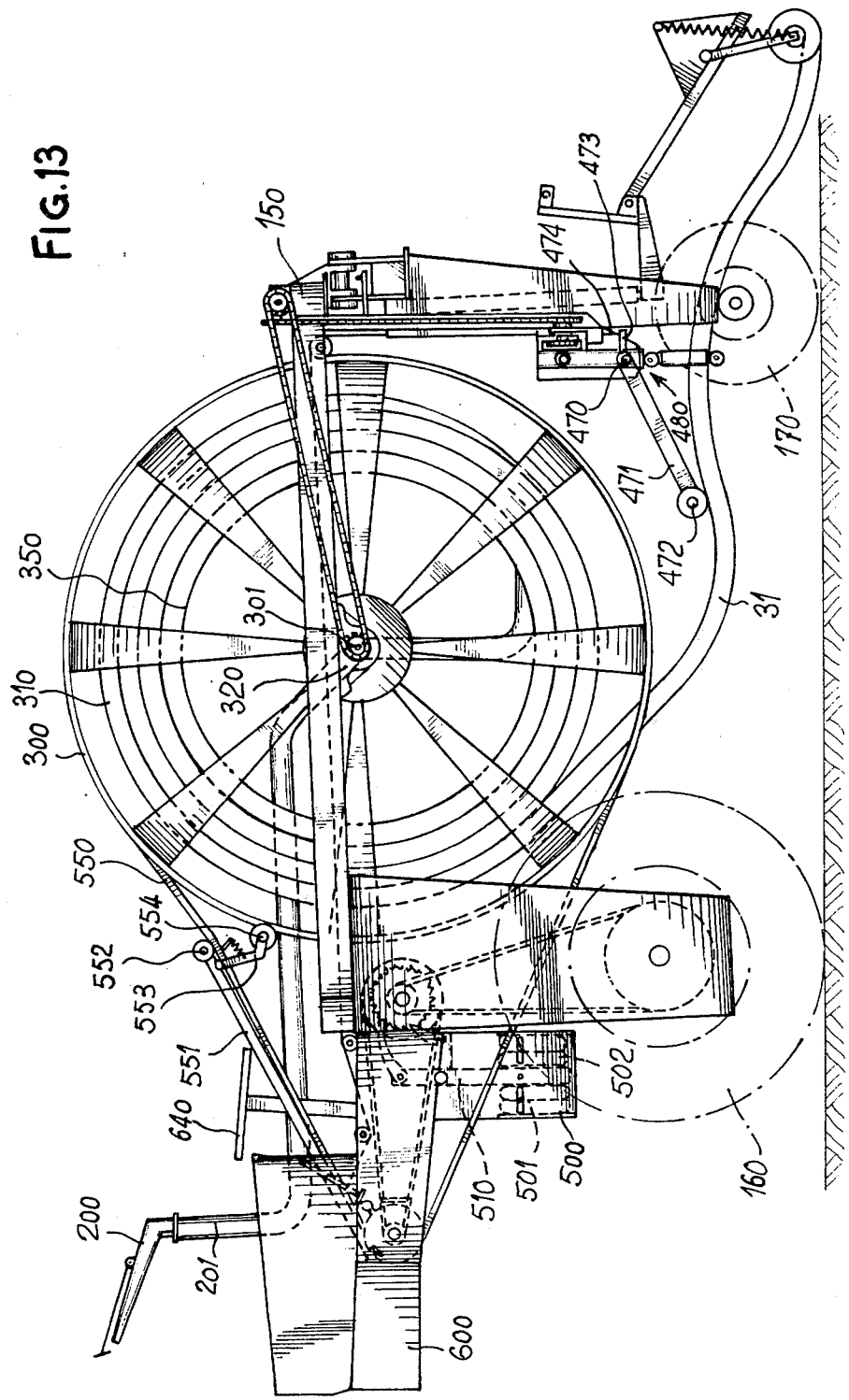
FIG. 13 is a side view of a fourth embodiment of the apparatus of the invention, which is an alternative of the third embodiment.
Figure 14:
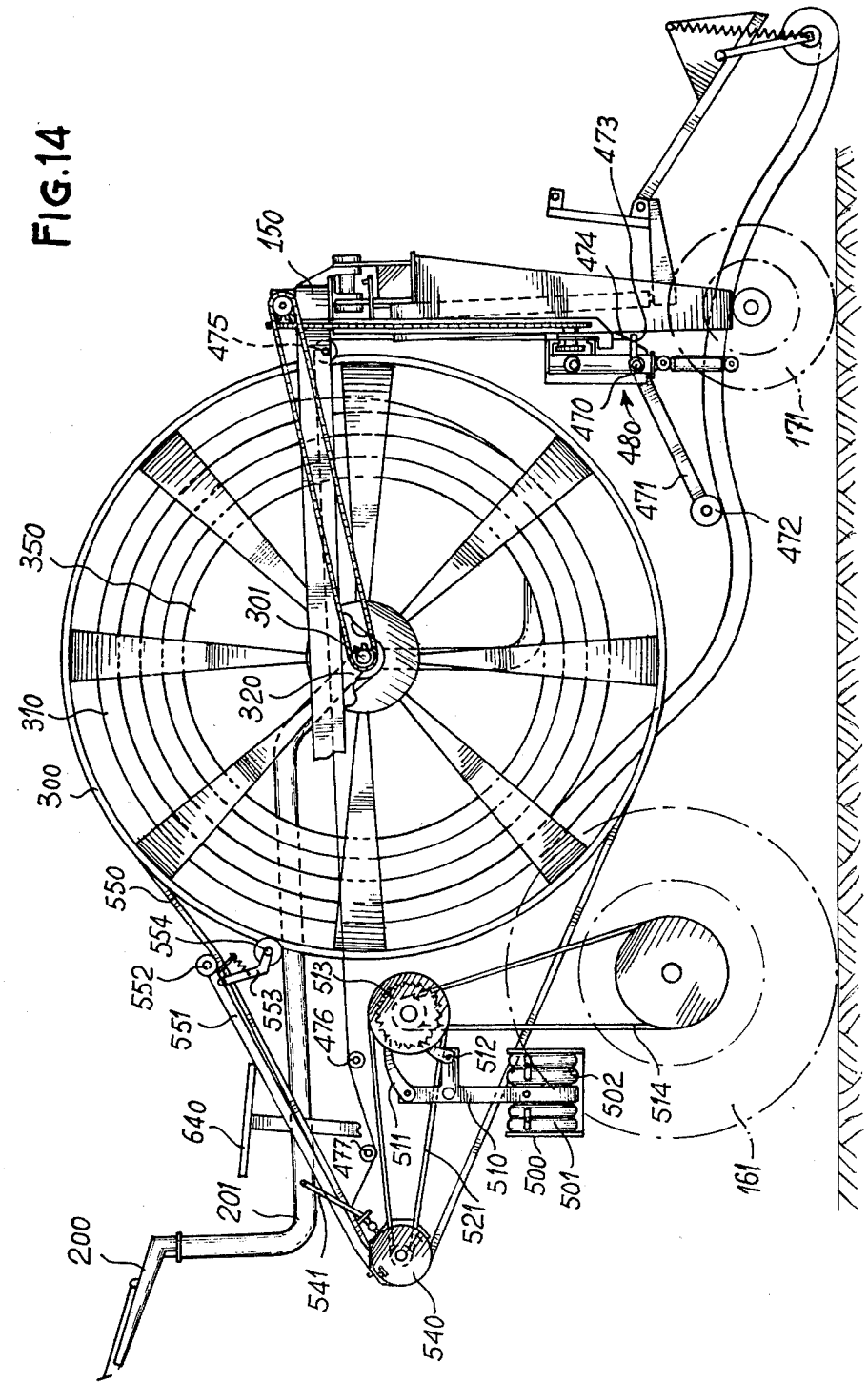
FIG. 14 is the same view as FIG. 13, but with the framework, a driving wheel and the auxiliary drive motor having been partially removed for better illustration of the hydraulic motor and of its connection with the driving wheels and the drum.
Figure 15:
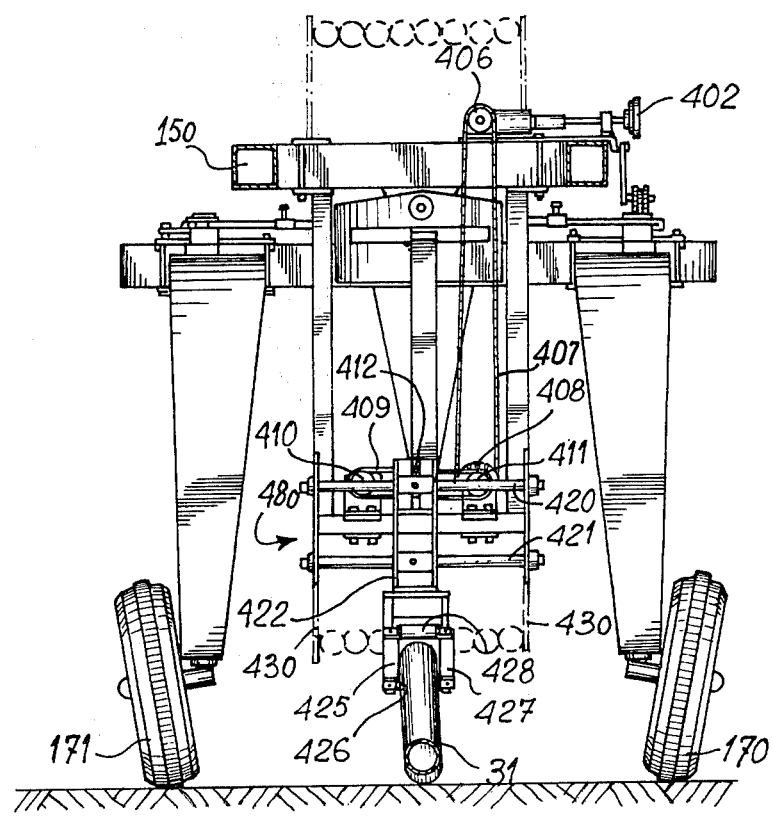
FIG. 15 is a simplified rear view of an apparatus according to the invention, showing a special device for winding up the pipe.

Other embodiments of the apparatus of this invention will now be described, with reference to FIGS. 11 through 15. FIGS. 11 and 12 depict a third embodiment, while FIGS. 13 and 14 depict a fourth embodiment, an alternative of said third embodiment. FIG. 15 illustrates a special device for winding up the pipe, applicable in each embodiment of this invention.

In FIGS. 11 through 15, the watering apparatus comprises a framework 150 provided with a pair of large wheels 160 and 161 at the front, and a pair of small steering wheels 170 and 171 at the rear (the front being defined according to the position of the operator control station). The apparatus travels in the general direction defined by the large wheels 160 and 161, subject to corrections in direction by the steering wheels.

On the framework there is mounted a watering device, constituted in the present case by a nozzle 200 for watering in an arc. This nozzle is connected by a bent tube 201 to the hollow shaft 301 of a drum 300 which carries a pipe 310, the inner wound end of which communicates via a rotary connection with the hollow shaft 301 and thereby with the nozzle 200. The drum 300 is mounted to rotate in bearings such as 320 secured on the framework 150.

On leaving the drum, the pipe meets a special winding device 480, the purpose of which is to allow the pipe to be wound in regular layers and which will be described in detail hereinbelow with reference to FIG. 15.

The pipe then leaves the apparatus to the rear and is connected to a water supplying station arranged on the land.

The apparatus is provided with a hydraulic motor 500, and most often with a self-contained drive motor 600, such as an internal combustion engine, having a tank (not shown) and advantageously associated with a gear box (also not shown). The control station is completed in particular by a hand wheel 640 acting on the steering wheels 170 and 171 by a steering gear (not shown).

The hydraulic motor 500 comprises in FIGS. 11 to 14 a jack device which is, in the present case, provided with two jacks 501 and 502. A conduit (not shown) connects the tube 201 or the shaft 301 to a slide valve or distributor (likewise not shown) which alternately supplies jacks 501 and 502 with pressurised water. The two jacks act jointly on a cross lever 510, the two arms of which are provided with pawls 511 and 512 which alternately cause a ratchet wheel 513 to advance.

On the same shaft as the ratchet wheel 513 is mounted a pinion which cooperates by a chain 514 with a homologous roller secured on the drive wheel 161. A similar arrangement ensures the drive of the other drive wheel 160. This assembly constitutes a first mechanical connection which allows the hydraulic motor 500 to drive the drive wheels.

Still on the same shaft as the ratchet wheel 513, another roller drives the chain 521, which reaches a roller mounted on the input shaft of a coupling in the form of a clutch device 540, provided with a control lever 541. The output shaft of the same clutch device drives the drum via another chain 550, meshing on teeth arranged on one of the peripheral edges of the drum. An arm 551 is urged elastically so that its end roller 552 stretches the chain. The same arm is provided with a pivoted lever 553, elastically urged so that its end wheel 554 straddles the peripheral teeth of the drum. In this way, a good meshing is ensured of the chain 550 on these teeth.

This assembly constitutes a second mechanical connection, which allows the hydraulic motor 500 to drive the drum in rotation; the clutch device inserted in this second mechanical connection allows a slip therein.

The transmission ratios of the two mechanical connections are determined as follows: when the apparatus advances by a given distance, the drum must rotate by a sufficient angle to wind a length of pipe equal to this distance, for a winding diameter close to the inner diameter taken at 350, or a little smaller.

When the winding diameter increases, a layer of pipe being already wound, the required angle of rotation of the drum then decreases, for the same distance of advance of the apparatus.

In the embodiments described hereinabove, the decrease of the required angle of rotation of the drum is accomodated with by the slip coupling alone.

According to the presently preferred embodiments of this invention, a device sensitive to the pull of the pipe controls the clutch so as to allow a slip (progressive or "all or nothing"0, this enabling the angle of rotation of the drum to be adapted as the winding diameter increases.

A first embodiment of this device, sensitive to pull, will now be described with reference to FIGS. 11 and 12.

Two arms 451 and 452 are pivoted in common on the framework at 450. They are urged elastically to move away from each other by a supple jack 454. The first arm carries a roller 456 which abuts against the layers of pipe already wound up. The second arm 452 also carries a roller 457 which abuts on the inner face of the pipe on leaving the drum. The two arms thus form scissors, taken between the pipe already wound up and the pipe which will be wound.

The outer arm 452 carries an extension 459 fast with a cable 460, which enters in a sheath 461 which abuts on an extension fast with the other arm 451. At its other end, the sheath stops on an abutment 465, fast with the framework, in the vicinity of clutch 540.

The cable 460 then controls the clutch lever 541.

Thsu, when the rotation of the drum winding the pipe exerts too strong a tension on said pipe, the two arms 451 and 452 move towards each other; this pulls on the cable 460, which actuates the clutch device to produce a slip, reducing or temporarily annuling the speed of rotation of the drum, depending upon the nature of the clutch device and its control. The apparatus continues to advance during this time and, as it winds little or no pipe, the tension of said pipe becomes normal again fairly quickly, the drive of the drum then taking up again.

In this way, the pipe is wound under a substantially constant tension, defined by the adjustment of the clutch and its control.

A second, more simple, embodiment of the device sensitive to pull will now be described with reference to FIGS. 13 and 14 (fourth embodiment of this invention).

A single arm 471, pivoted on the framework at 470, urges elastically or by its weight, a roller 472 which abuts on the inner face (with respect to the drum) of the pipe 310. On an extension 473 of the arm 471 is fixed a cable 474.

The cable 474 passes on the pulleys 475, 476 and 477 to control the clutch lever 541. The operation is the same as previously: when the pipe is too stretched, the arm 471, which raises, actuates the clutch via the cable 474 to slow down or temporarily stop the drive of the drum.

Although the invention is applicable whatever type of pipe is used, if finds particular advantage when the pipe is supple, such as a pipe made of plasticized polyvinyl chloride reinforced with polyester fibres.

It is also advantageous if such a pipe is maintained constantly under pressure, with the aid of two non-return valves permanently mounted at each of its ends.

The means according to the invention in fact allow the winding of the pipe under constant tension, this making it possible to use such supple pipes, without their being rapidly deteriorated.

In the preceding description of the third and fourth embodiments, the drive of the apparatus is constituted by its hydraulic motor 500. In fact, FIG. 11 for the first embodiment and FIG. 13 for the second embodiment also show a self-contained motor 600, such as an internal combustion engine. Said engine is coupled to the input shaft of the clutch 540 via a suitable transmission.

Thus, the pawls 511 and 512 being raised, the auxiliary motor 600 may be substituted for the hydraulic motor to produce the travelling of the apparatus and/or the winding of the pipe on the drum, the latter still being effected via the clutch device controlled by the means detecting the pull exerted on the pipe, if desired.

The special winding device 480 will now be described with reference to FIGS. 12 and 15, the latter being a view along the line A-A of FIG. 12 (the special winding device is the same in all FIGS. 11 to 14, and is applicable to any embodiment of this invention).

A roller 400 mounted on the shaft 301 of the drum (FIG. 12) drives a chain 401 reaching another roller 402 (FIG. 15). The latter actuates a bevel gear 406 which controls in turn a chain 407 advancing towards another bevel gear 408. The output motion of the bevel gear 408 actuates an endless chain 409 which is wound on two rollers 410 and 411, and bears a catch 412.

On the framework are mounted two tubes 420 and 421 parallel to the axis of the drum 300. These tubes form slides for a carriage 422. In its upper part, this carriage is provided with a slot where the catch 412 is engaged. Thus, during its movement with the chain 409, the catch 412 will drive the carriage 422 in a to and for movement (alternate translation) parallel to the axis of the drum.

In the lower part, the carriage 422 carries a ring, defined by four rollers 425 to 428 and through which the pipe 310 passes.

Thus, this guide ring displaced by the carriage 422 causes the point where the pipe is presented to the drum to be wound thereon, to vary.

The catch 412 is removable from the slot of the carriage 422, thereby enablng to immobilize the carriage in a chosen position, and enabling the pipe to be unwound in a fixed direction without undulations with respect to the travelling of the apparatus.

The mechanical connection between the shaft 301 of the drum and the carriage 422 is chosen such that an advance of the carriage corresponds to one revolution of the shaft of the drum, which advance is substantially equal to the diameter of the pipe.

Thus, the winding of the pipe in contiguous turns and in regular layers is obtained, over the whole useful width of the drum which is illustrated by the long broken lines 430 of FIG. 15.

The apparatus of the third and fourth embodiments is advantageously completed by a direction guiding device on the pipe, shown in FIGS. 11 to 14.

An arm 650 controls the steering wheels 120 and 121. This arm is provided with a weight 651 on which is pivoted at 652, a lever 653, which terminates in a grooved wheel 654, abutting on the pipe.

A pull string 655 gives the arm 653 two stable positions, on either side of a line perpendicular to the arm 650 passing through point 652.

As will be seen hereinbelow, at the end of path, an abutment opposes the roller 654 or the arm 653, which rocks. Once detected, this rocking controls the stopping of the hydraulic motor.

A complete operation of watering with the aid of the apparatus according to the invention may now be described.

By manually disconnecting the clutch with the aid of lever 541, the operator uses the auxiliary motor to bring the apparatus to the place which is to be watered, near a water supply station. After the pipe has been connected to the latter, the apparatus is moved away and the drum is disconnected, with the pipe being unwound while being braked by the inertia of the drum and/or by a brake (not shown) mounted on the periphery there of.

After having arrived at the point of departure of the zone to be watered, the operator places the roller 654 in position on the pipe, releases the disconnecting lever 451, replaces the pawls 511 and 512 in mesh on the ratchet wheel 513, interrupts, if need be, the braking of the drum, and blocks, if necessary, the dogs of the gear box associated with the auxiliary motor 600. He then switches on the watering device 200.

Thereafter, the functioning of the apparatus is entirely automatic; it returns towards the water feed station while watering, guided by the pipe itself, and winding said pipe on the drum, under constant tension and in regular layers with contiguous turns.

An abutment is places at the end of the zone to be watered, which ensures the automatic stopping of the apparatus, for example in the manner described previously.

The operator may then put the apparatus in position for another watering operation, at any time thereafter.

Of course, the invention is not limited to the embodiments disclosed and depicted hereinabove; many alternatives thereof can be provided without thereby departing from the scope of the invention.

What I claim is:

1. A watering apparatus comprising a framework having supporting wheels, said framework supporting:
    a watering device,
    a hydraulic motor,
    a rotary drum, forming a multiple layer storage for a pipe, one end of the pipe being connected to said watering device and said hydraulic motor, and the other end of the pipe leaving the drum and being adapted for connection to a land station supplying water under pressure, said other end of the pipe being provided with a connection capable of transverse pivoting, perpendicular to the direction of travel of the apparatus, when said connection cooperates with the water supplying land station,
    a first mechanical drive operable by hydraulic motor for driving certain of the supporting wheels, to cause said apparatus to travel on the land,
    a second mechanical drive, including slip coupling means, operable by the hydraulic motor for driving said rotary drum to wind up the pipe while the apparatus travels towards said water-supplying station,
    said first and second mechanical drives having such chosen transmission ratios that, with the effect of the slip coupling means, the pipe can wind up in successive layers with a small tension when the apparatus advances towards the water supplying station, a rocking member disposed beneath the apparatus in the vicinity of the drum, said rocking member being arranged to be rocked by the pipe when the apparatus passes above said water supplying station on the land, said rocking member controlling disconnection of said slip coupling means, whereby after complete winding of the pipe on the drum and arrival at the water supply station, the apparatus can continue watering while advancing in the same direction, with the pipe being now unwound.

2. A watering apparatus in accordance with claim 1, wherein said slip coupling means comprises a clutch.

3. A watering apparatus in accordance with claim 1, wherein the hydraulic motor comprises:
   a slide valve and jack assembly, said slide valve being coupled to said one end of the pipe and said jack having a rod capable of cooperating with said slide-valve for the same to supply the jack a produce alternate motion of the rod, when said slide-valve is fed with water under pressure, and
   a mechanical device in the form of a ratchet-wheel and a pawl coupled to said rod of the jack for driving said ratchet wheel into rotation in response to said alternate motion of the rod,
   said first and second mechanical drives starting from said ratchet wheel.

4. A watering apparatus in accordance with claim 3, wherein said slide-valve has two outlets respectively coupled to two inlets of the jack for alternately supplying said two inlets with water under pressure to produce the alternate motion of said rod of the jack, said apparatus further comprising means coupled to a selected one of the two outlets of said slide-valve, and capable of braking the wheels during the time periods they are not driven by said first mechanical drive.

5. A watering apparatus in accordance with claim 1, wherein said supporting wheels include a pair of driving wheels, and said first mechanical drive comprises two semi-shafts respectively coupled between said ratchet wheel and two driving wheels.

6. A watering apparatus in accordance with claim 5, wherein said second mechanical drive includes another shaft coupled to one of said semishafts, and said slip coupling means is arranged on said other shaft.

7. A watering apparatus in accordance with claim 6, wherein said second mechanical drive further comprises a chain coupled to said other shaft and cooperating with one of the peripheral edges of the drum for driving the drum.

8. A watering apparatus in accordance with claim 5, further comprising an internal combustion engine, a gear box coupled to said engine, and a differential coupled to said gear box, said differential having two output shafts coupled to said two semishafts, respectively.

9. A watering apparatus in accordance with claim 1, further comprising a second motor, independent of water supply, and means for connecting certain of the supporting wheels to be driven by said second motor.

10. A watering apparatus in accordance with claim 9, wherein said means for connecting certain of the supporting wheels are also adapted to connect said drum to be driven by said second motor.

11. A watering apparatus in accordance with claim 9, wherein said means for connecting certain of the supporting wheels includes an alternate coupling for permitting two different combinations of driving said certain of the supporting wheels and said drum.

12. A watering apparatus in accordance with claim 11, wherein said alternate coupling comprises a slidable dog-clutch device.

13. A watering apparatus in accordance with claim 1, further comprising a timing means capable of extending the watering for a predetermined time period after stopping of the apparatus at the end of its travel.

14. A watering apparatus in accordance with claim 13, wherein said timing means comprises a control valve having an input coupled to said one end of the pipe, a tank, means coupled between said control valve and the tank for filling the tank at an adjustable rate, and means responsive to the pressure within the tank for turning off the supply of water to said watering device.

15. A watering apparatus in accordance with claim 13, further comprising means on said apparatus adapted to cooperate with an abutment located on the land for operating said timing means.

16. A watering apparatus in accordance with claim 1, wherein the pipe is a supply pipe.

17. A watering apparatus in accordance with claim 1, wherein said supporting wheels include guiding wheels, and the apparatus further comprises first guiding means capable of cooperating with the pipe lying on the ground for defining the direction of said guiding wheels, and second guiding means capable of cooperating with a furrow formed in the ground for defining the direction of said guiding wheels, said second guiding means being operated by rocking of said rocking member.

18. A watering apparatus in accordance with claim 17, wherein said first guiding means comprises a pole having one of its ends coupled to said guiding wheels, and its other end supporting at least one wheel having a periphery adapted to cooperate with the pipe lying on the ground.

19. A watering apparatus in accordance with claim 18, wherein said wheel cooperating with the pipe is rotatably fitted at one end to a small pivoting arm whose other end is pivotably supported on said pole against a tightening spring, thereby determining two stable positions for the small arm and its wheels cooperating with the pipe.

20. A watering apparatus in accordance with claim 1, wherein said slip coupling means comprises a friction clutch.

21. A watering apparatus in accordance with claim 20, wherein said friction clutch comprises at least one friction wheel whose periphery frictionally engages said drum for rotating the same.

22. A watering apparatus in accordance with claim 21, wherein said friction wheel is supported by a pivoting arm, the pivoting of which permits disconnection of the friction clutch.

23. A watering apparatus comprising a framework having supporting wheels, said framework supporting:
   a watering device,
   a hydraulic motor,
   a rotary drum, forming a multiple layer storage for a pipe, one end of the pipe being connected to said watering device and said hydraulic motor, and the other end of the pipe leaving the drum and being adapted for connection to a land station, supplying water under pressure,
   a first mechanical drive operable by the hydraulic motor for driving certain of the supporting wheels, to cause said apparatus to travel on the land, a second mechanical drive, including a controllable slip coupling, operable by the hydraulic motor for driving said rotary drum to wind up the pipe while the apparatus travels towards said water-supplying station, and a tension detector means, cooperating with the pipe on the path thereof when leaving the drum towards the water-supply station, to detect the tension exerted on the pipe, said tension detector means being responsive to the tension of the pipe exceeding a predetermined value by controlling said coupling to decelerate the drive of the drum.

24. A watering apparatus in accordance with claim 23, wherein said slip coupling comprises a clutch.

25. A watering apparatus in accordance with claim 23, wherein the hydraulic motor comprises:

a slide valve and at least one jack assembly, said slide valve supplying the jack to produce alternate motion of the rod when said slide valve is fed with water under pressure, and a mechanical device of the pawl and ratchet-wheel type, having at least one ratchet-wheel, and a pawl coupled to said rod of the jack for driving said ratchet wheel into rotation in response to said alternate motion of the rod, said first and second mechanical drives starting from said ratchet wheel.

26. A watering apparatus in accordance with claim 25, wherein said supporting wheels include a pair of driving wheels, and said first mechanical drive comprises two semi-shafts respectively coupled between said ratchet wheel and said two driving wheels.

27. A watering apparatus in accordance with claim 26, wherein said second mechanical drive includes another shaft coupled to one of said semishafts, and said slip coupling is arranged on said other shaft.

28. A watering apparatus in accordance with claim 27, wherein the second mechanical drive further comprises a chain coupled to said other shaft and cooperating with one of the peripheral edges of the drum for driving the drum.

29. A watering apparatus in accordance with claim 23, wherein said supporting wheels include guiding wheels, and said apparatus further comprises first guiding means capable of cooperating with the pipe lying on the ground for defining the direction of said guiding wheels.

30. A watering apparatus in accordance with claim 29, wherein said first guiding means comprise a pole having one of its ends coupled to said guiding wheels, and its other end supporting at least one wheel defining a periphery adapted to cooperate with the pipe lying on the ground.

31. A watering apparatus in accordance with claim 30, wherein said wheel cooperating with the pipe is fitted rotating at one end of a small pivoting arm whose other end is pivotably supported on said pole against a tightening spring determining two stable positions for the small arm and its wheels cooperating with the pipe.

32. A watering apparatus in accordance with claim 23, further comprising a second motor, independent of water supply, and means for connecting certain of the supporting wheels to said second motor to be driven thereby.

33. A watering apparatus in accordance with claim 32, wherein said means for connecting are also adapted to connect said drum to said second motor to be driven thereby.

34. A watering apparatus in accordance with claim 23, further comprising timing means for extending the watering for a predetermined time period after stopping of the apparatus at the end of its travel, and feeling means adapted to cooperate with an abutment located on the land for operating said timing means.

35. A watering apparatus in accordance with claim 23, wherein the pipe is a supple pipe.

36. A watering apparatus in accordance with claim 23, wherein said tension detector means comprises at least one arm pivoted at one of its ends on the framework and provided at its other end with a roller cooperating with the pipe, and a cable connected to this arm for controlling the coupling.

37. A watering apparatus in accordance with claim 36, wherein said tension detector means comprises two arms pivoted jointly on the framework at a point close to the periphery of the drum, and respectively provided with rollers at their other ends, the two arms being elastically urged away from each other, the end roller of one of the arms abutting the pipe wound on the drum, and the end roller of the other arm abutting the pipe leaving the drum, between the pipe and the drum, and a cable connected to this latter arm and engaged in a sheath abutting on the first arm, to control the coupling.

38. A watering apparatus in accordance with claim 23, further comprising a special winding device composed of a carriage which cooperates with the pipe after it has left the drum and before it leaves the apparatus, said carriage being movable parallel to the axis of the drum, and means for driving the carriage in a movement of alternate translation covering substantially the width of the drum, in associated synchronism with the rotation of said drum, said carriage causing the point where the pipe engages the drum to vary, so that it is wound thereon in regular layers.

39. A watering apparatus in accordance with claim 38, wherein said special winding device comprises an endless chain, driving together with the drum, and provided with a finger which drives a carriage sliding on guides parallel to the axis of the drum, said carriage supporting the means cooperating with the pipe.

40. A watering apparatus in accordance with claim 38, further comprising means for immobilising the carriage of the special winding device in a chosen position, thereby enabling the pipe to be unwound in a fixed direction without undulations with respect to the travel of the apparatus.

41. A watering apparatus in accordance with claim 23, further comprising a self-contained drive motor for driving the apparatus, once the pipe is connected and while the pipe unwinds up to the limits of the zone to be watered; a direction guiding device comprising a sensor arm actuatable to cooperate with the portion of pipe which is unwound on the ground, the hydraulic motor being then actuated by the watering liquid under pressure to return the apparatus towards the water feed station while winding the pipe and while the watering device is in operation.

* * * * *